US012754743B2

(12) United States Patent
Yu et al.

(10) Patent No.: US 12,754,743 B2
(45) Date of Patent: Oct. 6, 2026

(54) PORT CONFIGURATION METHOD, COMPONENT, AND HARD DISK EXPANSION APPARATUS

(71) Applicant: SUZHOU METABRAIN INTELLIGENT TECHNOLOGY CO., LTD., Suzhou (CN)

(72) Inventors: Quanquan Yu, Suzhou (CN); Shuilun Fu, Suzhou (CN); Huanchao Wang, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 18/864,281

(22) PCT Filed: Jul. 27, 2023

(86) PCT No.: PCT/CN2023/109620
§ 371 (c)(1),
(2) Date: Nov. 8, 2024

(87) PCT Pub. No.: WO2024/103829
PCT Pub. Date: May 23, 2024

(65) Prior Publication Data

US 2025/0306953 A1 Oct. 2, 2025

(30) Foreign Application Priority Data

Nov. 14, 2022 (CN) ......................... 202211417411.1

(51) Int. Cl.
*G06F 9/4401* (2018.01)
*G06F 8/61* (2018.01)

(52) U.S. Cl.
CPC .............. *G06F 9/4411* (2013.01); *G06F 8/63* (2013.01)

(58) Field of Classification Search
CPC ................................ G06F 9/4411; G06F 8/63
See application file for complete search history.

(56) References Cited

U.S. PATENT DOCUMENTS 8,797,918 B1 * 8/2014 Nguyen .................. G06F 13/14 370/254
2005/0080881 A1 * 4/2005 Voorhees ................ H04L 45/02 709/238

(Continued)

FOREIGN PATENT DOCUMENTS

CN 103164381 A 6/2013
CN 110138622 A 8/2019

(Continued)

*Primary Examiner* — Tracy A Warren
(74) *Attorney, Agent, or Firm* — IPro, PLLC

(57) ABSTRACT

A port configuring method, an assembly and a hard-disk expanding device. The back-panel controller may, when the memory stores the port-configuration-topology type corresponding to a port configuring instruction, control an expanding chip to be powered off and subsequently powered on. After the expanding chip has been powered on, a target signal corresponding to the port-configuration-topology type is transmitted to the expanding chip, whereby the expanding chip reads a port-configuration firmware mirror image corresponding to the target signal from the internal memory, and based on the port-configuration firmware mirror image, configures the ports of the expanding chip itself. The present application increases the efficiency of the configuring of the ports of the expanding chip, which may reduce the cost on the hardware production and maintenance.

20 Claims, 6 Drawing Sheets

(56) References Cited

U.S. PATENT DOCUMENTS

| | | | | |
|---|---|---|---|---|
| 2013/0159558 | A1* | 6/2013 | Wu | G06F 13/4022 710/9 |
| 2014/0122761 | A1* | 5/2014 | Nagendra | H04L 67/51 710/300 |
| 2014/0325285 | A1 | 10/2014 | Wu | |
| 2018/0357003 | A1* | 12/2018 | Zhao | G06F 13/4022 |
| 2019/0245922 | A1* | 8/2019 | Legtchenko | G06F 11/2033 |

FOREIGN PATENT DOCUMENTS

| | | | |
|---|---|---|---|
| CN | 110166301 | A | 8/2019 |
| CN | 111880727 | A | 11/2020 |
| CN | 113254087 | A | 8/2021 |
| CN | 113794587 | A | 12/2021 |
| CN | 114860494 | A | 8/2022 |
| CN | 115562738 | A | 1/2023 |

* cited by examiner

PORT CONFIGURATION METHOD, COMPONENT, AND HARD DISK EXPANSION APPARATUS

CROSS-REFERENCE TO RELATED APPLICATION

The present application claims the priority of the Chinese patent application filed on Nov. 14, 2022 before the Chinese Patent Office with the application number of 202211417411.1 and the title of "PORT CONFIGURATION METHOD, COMPONENT, AND HARD DISK EXPANSION APPARATUS", which is incorporated herein in its entirety by reference.

FIELD

The present application relates to the technical field of computers, and particularly relates to a port configuring method, an assembly and a hard-disk expanding device.

BACKGROUND

Currently, in order to realize hard-disk expansion, it is required to define the ports of an expanding chip in the Expander firmware of the expanding chip, so as to determine which ports of the expanding chip are connected to servers and which ports are connected to the hard disks, whereby the corresponding connection topology can be constructed.

Usually, the configuration of the ports of an expanding chip is written fixedly in its firmware. If an expanding chip has 24 ports, then its port-configuration-topology type may be that the ports 0-3 are, in its firmware, configured to be the ports connected to the hard disks, the ports 4-15 are, in its firmware, configured to be the ports connected to other expanding chips, and the ports 16-23 are, in its firmware, configured to be the ports connected to servers.

If it is intended to configure the ports of the expanding chip with another topology type, it is required to re-produce an expanding chip totally the same as that expanding chip, and compile a new firmware for the newly produced expanding chip, and it is further required to layout the newly produced expanding chip in the hard-disk expanding device, which increases the cost on the hardware production and maintenance.

SUMMARY

An object of the present application is to provide a port configuring method, an assembly and a hard-disk expanding device, to conveniently configure the ports of the expanding chip, and reduce the cost on the hardware production and maintenance. The particular solutions are as follows:

The present application provides a port configuring method, wherein the port configuring method is applied to a back-panel controller, and the port configuring method comprises:

- receiving a port configuring instruction sent by a base-board management controller;
- in response to a memory of the hard-disk expanding device storing a port-configuration-topology type corresponding to the port configuring instruction, controlling a target expanding chip in the hard-disk expanding device to be powered off and subsequently powered on; and
- after the target expanding chip has been powered on, transmitting a target signal corresponding to the port-configuration-topology type to the target expanding chip, whereby the target expanding chip reads a port-configuration firmware mirror image corresponding to the target signal from an internal memory of the hard-disk expanding device, and based on the port-configuration firmware mirror image, configures ports of the target expanding chip itself.

In some embodiments of the present application, the step of receiving the port configuring instruction sent by the base-board management controller comprises:

- receiving the port configuring instruction via an Inter-Integrated Circuit (I2C) bus.

In some embodiments of the present application, the step of transmitting the target signal corresponding to the port-configuration-topology type to the target expanding chip comprises:

- reading and identifying the port-configuration-topology type from the memory;
- inquiring the target signal corresponding to the port-configuration-topology type; and
- transmitting the target signal to the target expanding chip via a self-configurable lead.

In some embodiments of the present application, the port configuring method further comprises:

- in response to the memory not storing the port-configuration-topology type, acquiring the port-configuration-topology type from the base-board management controller, and writing the acquired port-configuration-topology type into the memory.

In some embodiments of the present application, the target expanding chip, after inquiring an internal-memory region corresponding to the target signal in the internal memory, and reading the port-configuration firmware mirror image within the internal-memory region, loads the port-configuration firmware mirror image, to complete the configuring of the ports of the target expanding chip itself.

In some embodiments of the present application, in response to initialization of the base-board management controller having been completed, the base-board management controller sends the port configuring instruction to the back-panel controller; or

- in response to the base-board management controller acquiring a port-configuration modifying instruction, the base-board management controller sends the port configuring instruction to the back-panel controller.

The present application provides a port configuring apparatus, wherein the port configuring apparatus is applied to a back-panel controller in a hard-disk expanding device, and the port configuring apparatus comprises:

- a receiving module configured for receiving a port configuring instruction sent by a base-board management controller;
- a controlling module configured for, in response to a memory of the hard-disk expanding device storing a port-configuration-topology type corresponding to the port configuring instruction, controlling a target expanding chip in the hard-disk expanding device to be powered off and subsequently powered on; and
- a configuring module configured for, after the target expanding chip has been powered on, transmitting a target signal corresponding to the port-configuration-topology type to the target expanding chip, whereby the target expanding chip reads a port-configuration firmware mirror image corresponding to the target signal from an internal memory of the hard-disk expanding device, and based on the port-configuration firmware mirror image, configures ports of the target expanding chip itself.

In some embodiments of the present application, the receiving module is particularly configured for receiving the port configuring instruction via an Inter-Integrated Circuit (I2C) bus.

In some embodiments of the present application, the configuring module is particularly configured for:

reading and identifying the port-configuration-topology type from the memory;

inquiring the target signal corresponding to the port-configuration-topology type; and transmitting the target signal to the target expanding chip via a self-configurable lead.

In some embodiments of the present application, the apparatus further comprises:

a writing module configured for, in response to the memory not storing the port-configuration-topology type, acquiring the port-configuration-topology type from the base-board management controller, and writing the acquired port-configuration-topology type into the memory.

In some embodiments of the present application, the target expanding chip, after inquiring an internal-memory region corresponding to the target signal in the internal memory, and reading the port-configuration firmware mirror image within the internal-memory region, loads the port-configuration firmware mirror image, to complete the configuring of the ports of the target expanding chip itself.

In some embodiments of the present application, in response to initialization of the base-board management controller having been completed, the base-board management controller sends the port configuring instruction to the back-panel controller; or in response to the base-board management controller acquiring a port-configuration modifying instruction, the base-board management controller sends the port configuring instruction to the back-panel controller.

The present application provides a hard-disk expanding device, wherein the hard-disk expanding device comprises a back-panel controller connected to a base-board management controller, a memory and a target expanding chip that are connected to the back-panel controller, and an internal memory connected to the target expanding chip;

the memory is configured for storing at least one port-configuration-topology type;

the internal memory is configured for storing a plurality of port-configuration firmware mirror images; and the back-panel controller is configured for:

receiving a port configuring instruction sent by the base-board management controller;

in response to the memory storing a current port-configuration-topology type corresponding to the port configuring instruction, controlling the target expanding chip to be powered off and subsequently powered on; and after the target expanding chip has been powered on, transmitting a target signal corresponding to the current port-configuration-topology type to the target expanding chip, whereby the target expanding chip reads an instance of the port-configuration firmware mirror images corresponding to the target signal from the internal memory, and based on the read port-configuration firmware mirror image, configures ports of the target expanding chip itself.

In some embodiments of the present application, the base-board management controller is connected to the back-panel controller via an Inter-Integrated Circuit (I2C) bus; and correspondingly, the back-panel controller is particularly configured for receiving the port configuring instruction via the I2C bus.

In some embodiments of the present application, the back-panel controller is connected to the target expanding chip via a self-configurable lead; and correspondingly, the back-panel controller is particularly configured for transmitting the target signal to the target expanding chip via the self-configurable lead.

In some embodiments of the present application, the back-panel controller is further configured for:

in response to the memory not storing the current port-configuration-topology type corresponding to the port configuring instruction, acquiring the current port-configuration-topology type from the base-board management controller, and writing the acquired current port-configuration-topology type into the memory.

In some embodiments of the present application, the hard-disk expanding device further comprises:

a sensor connected to the back-panel controller; and correspondingly, the sensor is configured for detecting information of an environment where the hard-disk expanding device is located.

In some embodiments of the present application, ports of the target expanding chip that are configured to be a downstream port are connected to a hard disk or an object expanding chip; and ports of the target expanding chip that are configured to be an upstream port are connected to the back-panel controller.

The present application provides an electronic device, wherein the electronic device comprises:

a memory configured for storing a computer program; and a processor configured for executing the computer program to implement the port configuring method stated above.

The present application provides a non-volatile readable storage medium, wherein the non-volatile readable storage medium is configured for saving a computer program, and the computer program, when executed by a processor, implements the port configuring method stated above.

It can be known from the above solutions that the present application provides a port configuring method, wherein the port configuring method is applied to a back-panel controller, and the port configuring method comprises: receiving a port configuring instruction sent by a base-board management controller; if the memory stores the port-configuration-topology type corresponding to the port configuring instruction, controlling the target expanding chip to be powered off and subsequently powered on; and after the target expanding chip has been powered on, transmitting a target signal corresponding to the port-configuration-topology type to the target expanding chip, whereby the target expanding chip reads a port-configuration firmware mirror image corresponding to the target signal from the internal memory, and based on the port-configuration firmware mirror image, configures the ports of the target expanding chip itself.

It can be seen that the back-panel controller according to the present application, after receiving the port configuring instruction sent by the base-board management controller, may detect whether the memory stores the port-configuration-topology type corresponding to the port configuring instruction, and if the memory stores the port-configuration-topology type corresponding to the port configuring instruction, then the back-panel controller controls the expanding chip to be powered off and subsequently powered on. After the expanding chip has been powered on, a target signal corresponding to the port-configuration-topology type is transmitted to the expanding chip, whereby the expanding chip reads a port-configuration firmware mirror image corresponding to the target signal from the internal memory, and based on the port-configuration firmware mirror image, configures the ports of the expanding chip itself. The solution may, under the controlling by the base-board management controller and the back-panel controller, automatically enable the expanding chip to complete the configuring of the ports of the expanding chip itself based on the port-configuration firmware mirror image specified by the port configuring instruction sent by the base-board management controller, which has a high efficiency of configuring. Accordingly, that may realize that, if the port configuring instruction sent by the base-board management controller specifies a certain type of the port configuration, the expanding chip may employ the firmware mirror image corresponding to the corresponding topology type to configure the ports of the expanding chip itself. Therefore, the same one expanding chip may, under the controlling by the base-board management controller and the back-panel controller, realize the port configurations of different topology types, thereby increasing the utilization ratio of the expanding chip, without newly adding an expanding chip, and without re-performing hardware arrangement in the hard-disk expanding device. Therefore, the ports of the expanding chip may be configured conveniently, which reduces the cost on the hardware production and maintenance.

Correspondingly, the port configuring assembly and the hard-disk expanding device according to the present application also have the above technical effects. The assembly is an apparatus, a device or a non-volatile readable storage medium.

BRIEF DESCRIPTION OF THE DRAWINGS

In order to more clearly illustrate the technical solutions of the embodiments of the present application or the prior art, the figures that are required to describe the embodiments or the prior art will be briefly described below. Apparently, the figures that are described below are merely embodiments of the present application, and a person skilled in the art can obtain other figures according to the provided figures without paying creative work.

DETAILED DESCRIPTION

The technical solutions of the embodiments of the present application will be clearly and completely described below with reference to the drawings of the embodiments of the present application. Apparently, the described embodiments are merely certain embodiments of the present application, rather than all of the embodiments. All of the other embodiments that a person skilled in the art obtains on the basis of the embodiments of the present application without paying creative work fall within the protection scope of the present application.

Currently, the configuration of the ports of an expanding chip is written fixedly in its firmware. If the ports of the same one expanding chip are configured with different topology types, it is required to produce a plurality of the same expanding chips, and compile the corresponding firmwares for each of the expanding chips, and it is further required to layout the expanding chips in different hard-disk expanding devices, which increases the cost on the hardware production and maintenance. In view of the above, the present application provides a port configuring solution, which may conveniently configure the ports of the expanding chip, and reduce the cost on the hardware production and maintenance.

Figure 1:
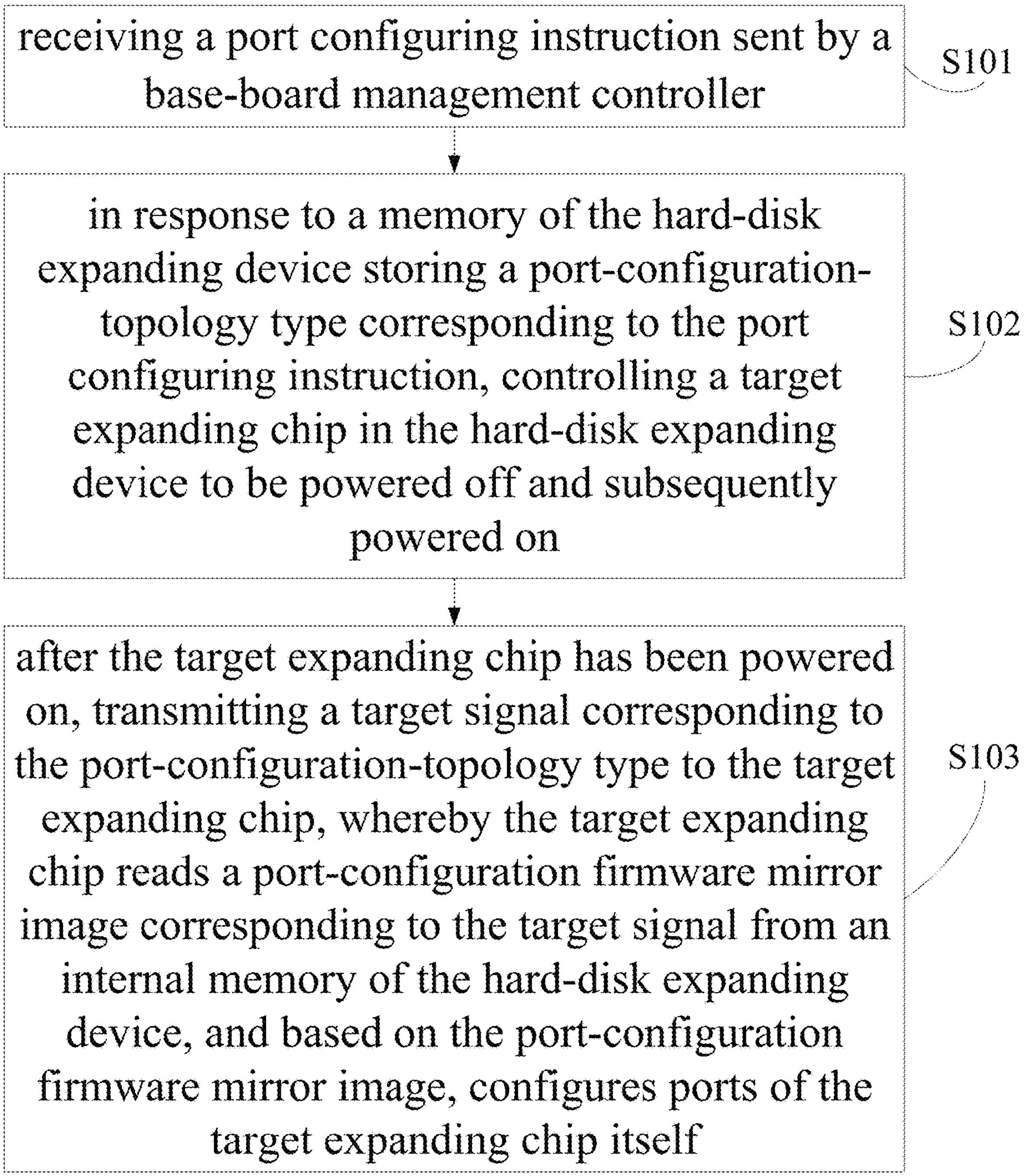
FIG. 1 is a flow chart of a port configuring method according to the present application.

Referring to FIG. 1, an embodiment of the present application discloses a port configuring method, wherein the port configuring method is applied to a back-panel controller in a hard-disk expanding device, and the port configuring method comprises:

S101: receiving a port configuring instruction sent by a base-board management controller.

In the present embodiment, the back-panel controller in the hard-disk expanding device and the base-board management controller in a server are connected by an I2C (Inter-Integrated Circuit) bus, and, accordingly, in some embodiments of the present application, the step of receiving the port configuring instruction sent by the base-board management controller comprises: receiving the port configuring instruction via an Inter-Integrated Circuit (I2C) bus. The port configuring instruction specifies the port-configuration-topology type, and the port-configuration-topology type may be modified based on the total quantity of the ports of the expanding chip.

In some embodiments of the present application, if the base-board management controller completes the initialization in the starting-up of the server, the base-board management controller sends the port configuring instruction to the back-panel controller; or in response to the base-board management controller acquiring a port-configuration modifying instruction, the base-board management controller sends the port configuring instruction to the back-panel controller. The port-configuration modifying instruction may be sent to the base-board management controller by the user by using a managing terminal of the base-board management controller.

In an example, regarding the Expander of an expanding chip having 24 ports, the topology of its 16 downstream ports has various types such as “4+12”, “12+4” and “2+12+2”. In the “4+12”, the “12” indicates that 12 ports among the ports of the expanding chip are directly connected to the hard disks, and the “4” indicates that 4 ports among the ports of the expanding chip are directly connected to other expanding chips. In the “2+12+2”, the “12” indicates that 12 ports among the ports of the expanding chip are directly connected to the hard disks, the first “2” indicates that 2 ports among the ports of the expanding chip are directly connected to other expanding chips, and the second “2” indicates that the other 2 ports among the ports of the expanding chip are directly connected to other expanding chips. It can be seen that, in the above three types merely the downstream ports are defined. Usually, 8 upstream ports are defined, because the server side usually provides 8 ports for the expanding chip to connect to.

Figure 2:
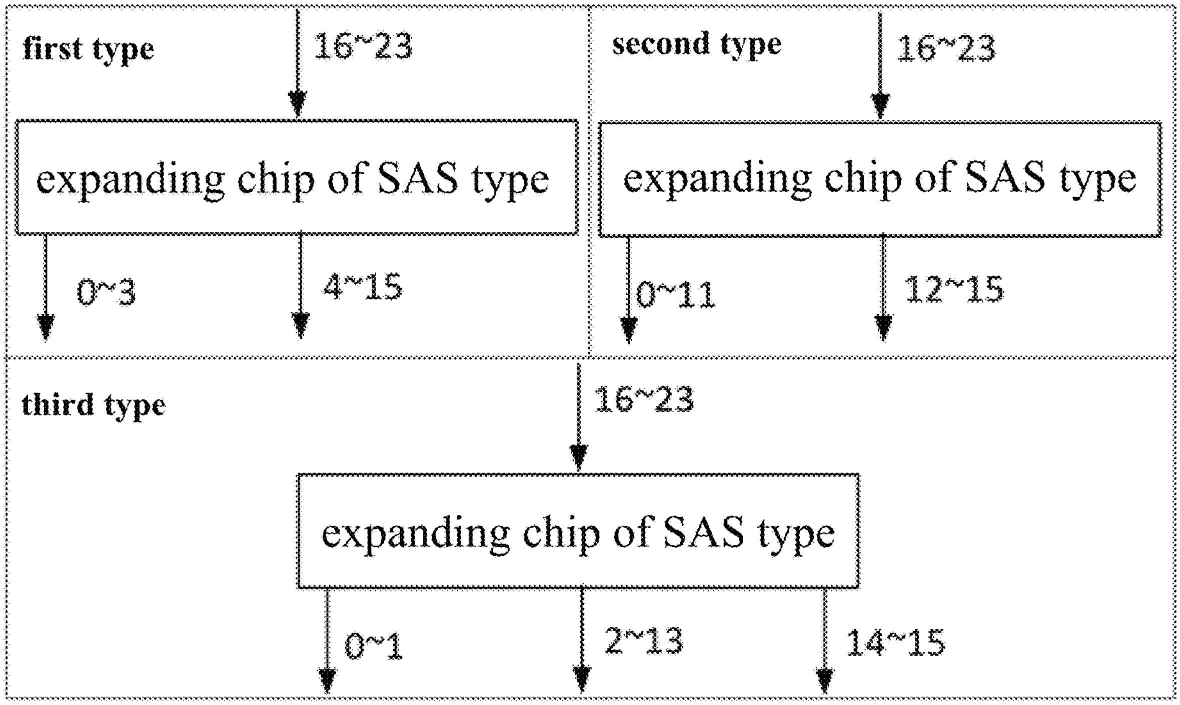
FIG. 2 is a schematic diagram of the port-configuration-topology type of an expanding chip according to the present application.

Referring to FIG. 2, the port-configuration-topology type of an SAS Expander (SAS (Serial Attached SCSI ((Small Computer System Interface)), or an expanding chip of the type of series-connected SCSIs) having 24 ports may have three, as shown in FIG. 2, or more types. In the first type of "4+12", the ports 0-3 are, in its firmware, configured to be the ports connected to the hard disks, the ports 4-15 are, in its firmware, configured to be the ports connected to other Expanders, and the ports 16-23 are, in its firmware, configured to be the ports connected to servers. In the second type of "12+4", the ports 0-11 are, in its firmware, configured to be the ports connected to other Expanders, the ports 12-15 are, in its firmware, configured to be the ports connected to the hard disks, and the ports 16-23 are, in its firmware, configured to be the ports connected to servers. In the third type of "2+12+2", the ports 0-1 are, in its firmware, configured to be the ports connected to other Expanders, the ports 2-13 are, in its firmware, configured to be the ports connected to the hard disks, the ports 14-15 are, in its firmware, configured to be the ports connected to other Expanders, and the ports 16-23 are, in its firmware, configured to be the ports connected to servers.

As shown in FIG. 2, the same one Expander may employ various types of port-configuration topologies. The Expander may be SAS or of another type, the upstream ports of the Expander are for connecting to the chips in the base-board management controller BMC (Board Management Controller) of the server that are of the chip type the same as that of the Expander (for example, an SAS Expander is connected to an SAS card), and its downstream ports may be cascaded to other Expanders or directly connected to the hard disks.

S102: in response to a memory of the hard-disk expanding device storing a port-configuration-topology type corresponding to the port configuring instruction, controlling a target expanding chip in the hard-disk expanding device to be powered off and subsequently powered on.

In the present embodiment, the memory is provided in the back panel, and is configured for storing at least one port-configuration-topology type. Certainly, it may further store the information of the back panel such as the manufacturer, the model and the ID.

In some embodiments of the present application, the step of transmitting the target signal corresponding to the port-configuration-topology type to the target expanding chip comprises:

- reading and identifying the port-configuration-topology type from the memory;
- inquiring the target signal corresponding to the port-configuration-topology type; and
- transmitting the target signal to the target expanding chip via a self-configurable lead (for example, a GPIO (General Purpose Input/Output Port) lead).

S103: after the target expanding chip has been powered on, transmitting a target signal corresponding to the port-configuration-topology type to the target expanding chip, whereby the target expanding chip reads a port-configuration firmware mirror image corresponding to the target signal from an internal memory of the hard-disk expanding device, and based on the port-configuration firmware mirror image, configures ports of the target expanding chip itself.

Figure 3:
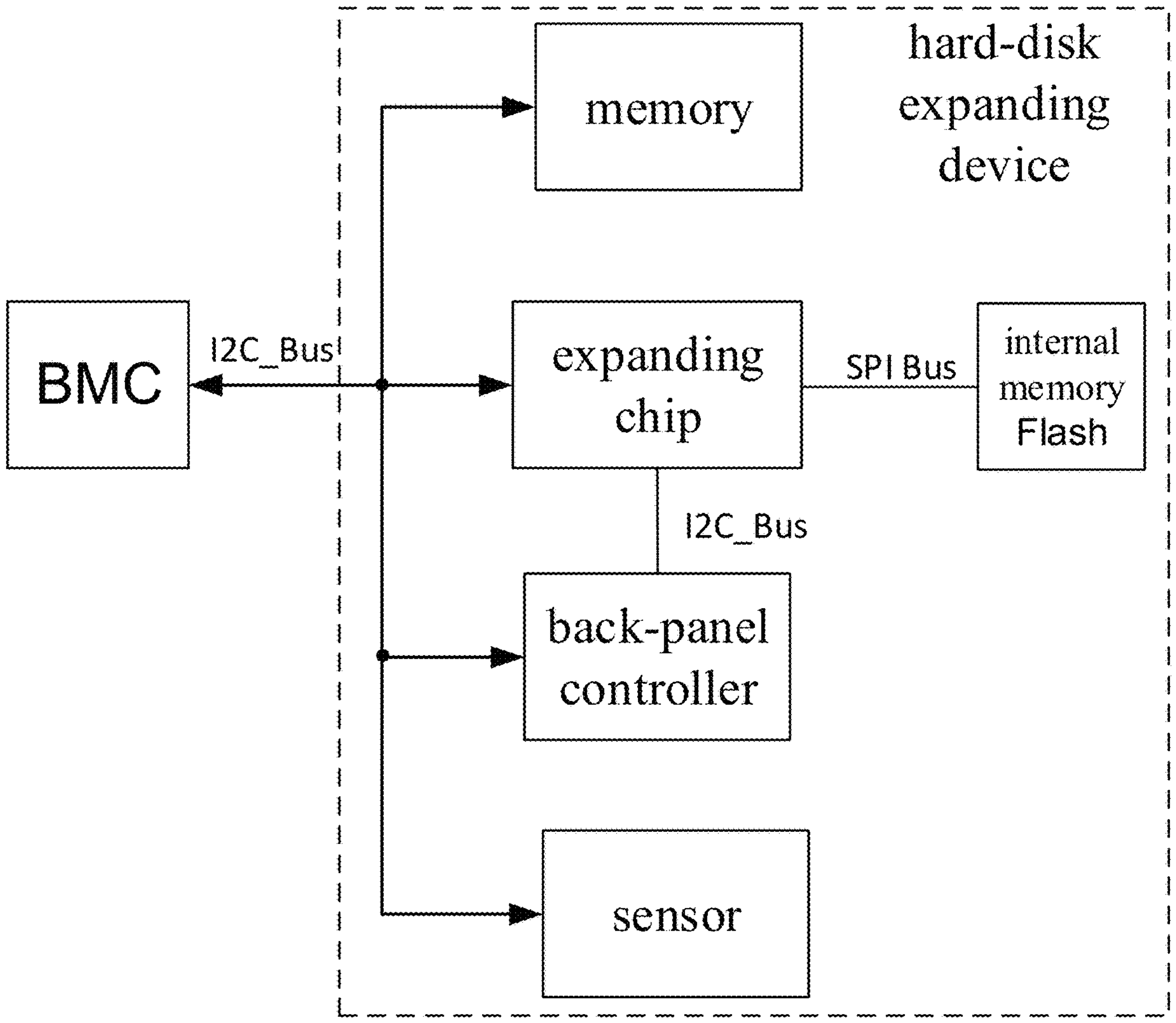
FIG. 3 is a schematic diagram of a hard-disk expanding device according to the present application.

In the present embodiment, the back-panel controller may control the powering-on or powering-off of the target expanding chip solely, which may facilitate to flexibly configure the ports of the target expanding chip. Usually, all of the devices including the back-panel controller, the memory, the Expander and the internal memory are arranged at the back panel, and are circuit-connected via the back panel, so as to form the hard-disk expanding device. Therefore, after the back-panel controller has been connected to the BMC, the components of the hard-disk expanding device are electrified due to the powering-on of the base-board management controller. Therefore, the powering-on or powering-off of the Expander cannot be solely controlled, but it is powered on or powered off together with the other components of the hard-disk expanding device. If the firmware of the Expander is modified, it is required to power off and reset the entire hard-disk expanding device. The connection relation among the components of the hard-disk expanding device may refer to FIG. 3, wherein both of the memory and the internal memory in FIG. 3 are a non-volatile readable storage medium. As shown in FIG. 3, the hard-disk expanding device may further comprise a sensor, and the sensor is configured for detecting the information of the environment where the hard-disk expanding device is located. For example, if the sensor is a temperature sensor, it may detect the temperature of the environment where the hard-disk expanding device is located. If the sensor is a humidity sensor, it may detect the humidity of the environment where the hard-disk expanding device is located. The back-panel controller, by using the information of the environment where it itself is located, can determine timely whether the space environment where the device is located is suitable.

In some embodiments of the present application, the port configuring method further comprises:

- in response to the memory not storing the port-configuration-topology type, acquiring the port-configuration-topology type from the base-board management controller, and writing the acquired port-configuration-topology type into the memory.

It should be noted that the target expanding chip may, after inquiring an internal-memory region corresponding to the target signal in the internal memory, and reading the port-configuration firmware mirror image within the internal-memory region, load the port-configuration firmware mirror image, to complete the configuring of the ports of the target expanding chip itself. The different internal-memory regions in the internal memory store the mirror images of different port-configuration firmwares.

It can be seen that the back-panel controller according to the present embodiment, after receiving the port configuring instruction sent by the base-board management controller, may detect whether the memory stores the port-configuration-topology type corresponding to the port configuring instruction, and if the memory stores the port-configuration-topology type corresponding to the port configuring instruction, then the back-panel controller controls the expanding chip to be powered off and subsequently powered on. After the expanding chip has been powered on, a target signal corresponding to the port-configuration-topology type is transmitted to the expanding chip, whereby the expanding chip reads a port-configuration firmware mirror image corresponding to the target signal from the internal memory, and based on the port-configuration firmware mirror image, configures the ports of the expanding chip itself. The solution may, under the controlling by the base-board management controller and the back-panel controller, automatically enable the expanding chip to complete the configuring of the ports of the expanding chip itself based on the port-configuration firmware mirror image specified by the port configuring instruction sent by the base-board management controller, which has a high efficiency of configuring. Accordingly, that may realize that, if the port configuring instruction sent by the base-board management controller specifies a certain type of the port configuration, the expanding chip may employ the firmware mirror image corresponding to the corresponding topology type to configure the ports of the expanding chip itself. Therefore, the same one expanding chip may, under the controlling by the base-board management controller and the back-panel controller, realize the port configurations of different topology types, thereby increasing the utilization ratio of the expanding chip, without newly adding an expanding chip, and without re-performing hardware arrangement in the hard-disk expanding device. Therefore, the ports of the expanding chip may be configured conveniently, which reduces the cost on the hardware production and maintenance.

The hard-disk expanding back panel will be designed below by taking an SAS Expander as an example, and the hard-disk expanding back panel designed in the present embodiment may particularly refer to FIG. 4, wherein the FRU (Field Replaceable Unit, or the field replaceable unit in the storage system) (i.e., the memory described above) stores the topology type applicable to the SAS Expander, and the back-panel controller may read the topology type stored in the FRU. Moreover, the back-panel controller can control the powering-on or powering-off of the SAS Expander, so that the SAS Expander loads the firmware mirror image corresponding to the topology type stored by the FRU, whereby the ports of the SAS Expander may be configured with different topologies, to realize switching of the topology type. That solution, as compared with conventional solutions, has a better flexibility, and may reduce the production cost of the back panel used for expanding hard disks.

Figure 4:
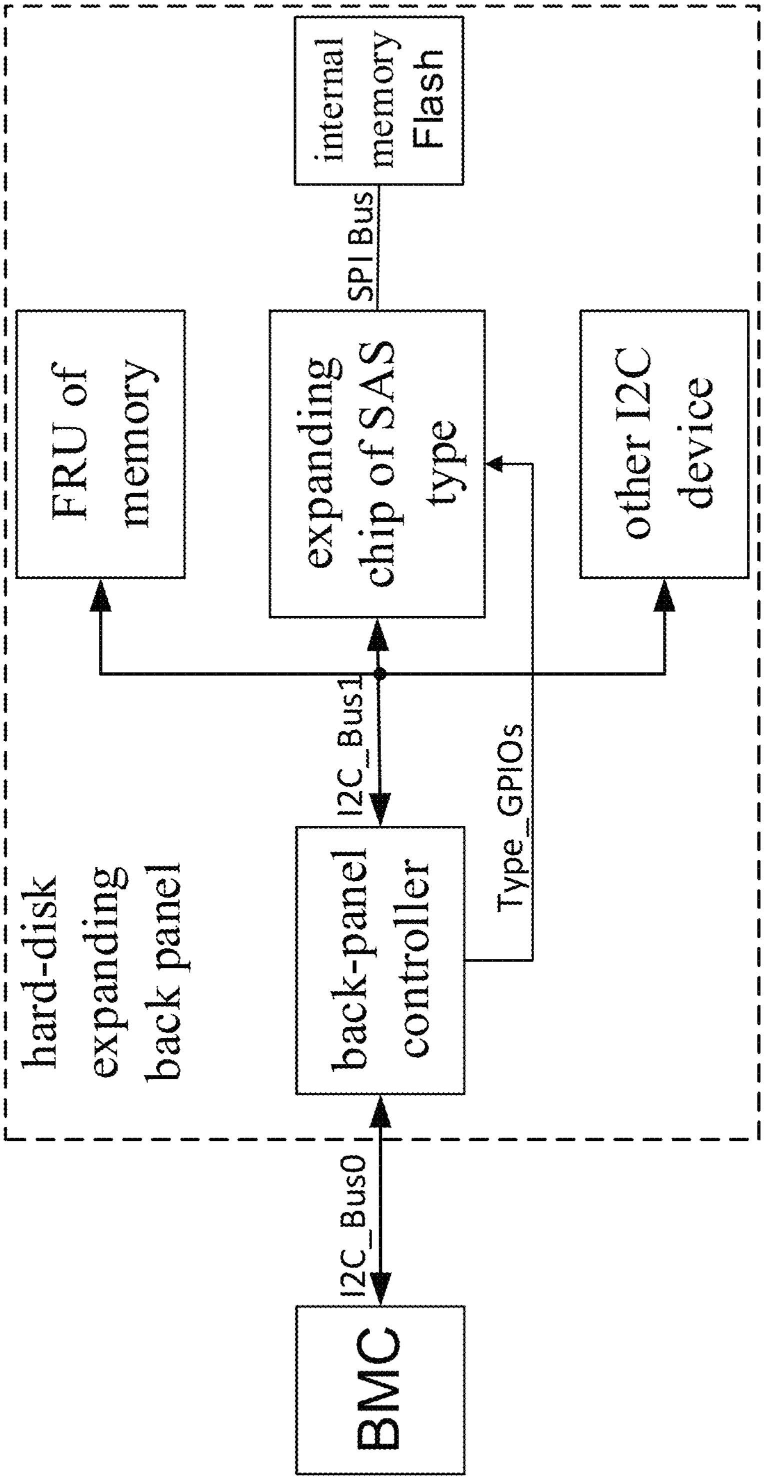
FIG. 4 is a schematic diagram of a hard-disk expanding back panel according to the present application.

Referring to FIG. 4, the BMC of the server is connected to the back-panel controller in the back panel via a channel of an I2C Bus0, and may further be indirectly connected to another I2C device in the back panel. Moreover, the back-panel controller, as the main control chip for the management of the back panel, may access the FRU, the SAS Expander and another I2C slave device (for example, a temperature sensor) via another channel of an I2C Bus1. The FRU stores the topological data (i.e., the port-configuration-topology type described above) applicable to the SAS Expander currently, and may be read by the back-panel controller that has been powered on. The topological data stored in the FRU support the BMC of the server to indirectly read and modify via the back-panel controller. The internal memory Flash is configured for storing the mirror images of a plurality of topological firmwares, and each of the mirror images corresponds to one usable SAS Expander topology type. The back-panel controller, after reading and identifying the topology type in the FRU, controls the SAS Expander via the GPIO base pins to be powered on, to enable the SAS Expander to load the different mirror images in the Flash, whereby the definitions on the PHY (Port Physical Layer) ports of the SAS Expander are consistent with the topological data in the FRU.

When the SAS Expander requires applying other topological data, the BMC may control the back-panel controller via the I2C Bus0 to indirectly modify the topological data in the FRU. For example, the BMC causes the back-panel controller to use new topological data to cover the original topological data in the FRU, and subsequently the back-panel controller controls the SAS Expander to be powered off and subsequently powered on, to cause the SAS Expander to load from the Flash the mirror image corresponding to the currently new topological data, thereby completing the topology switching. The topological data in the FRU and the mirror image in the Flash are not lost in powering-down.

In the present embodiment, the back-panel controller is used as the main control chip for the management of the back panel, and the controller may control the powering-on or powering-off of the SAS Expander solely. Moreover, the powering-on or powering-off of the back panel is controlled by the mainboard of the BMC. It can be seen that the powering-on and powering-off of the SAS Expander may be controlled flexibly by the back-panel controller, and, on that basis, in the topology modification, it is not required to power off and power on the entire back panel, and merely the SAS Expander is controlled to be powered off and powered on, which facilitates to realize the topology modification, and has a low affection on the entire server.

Figure 5:
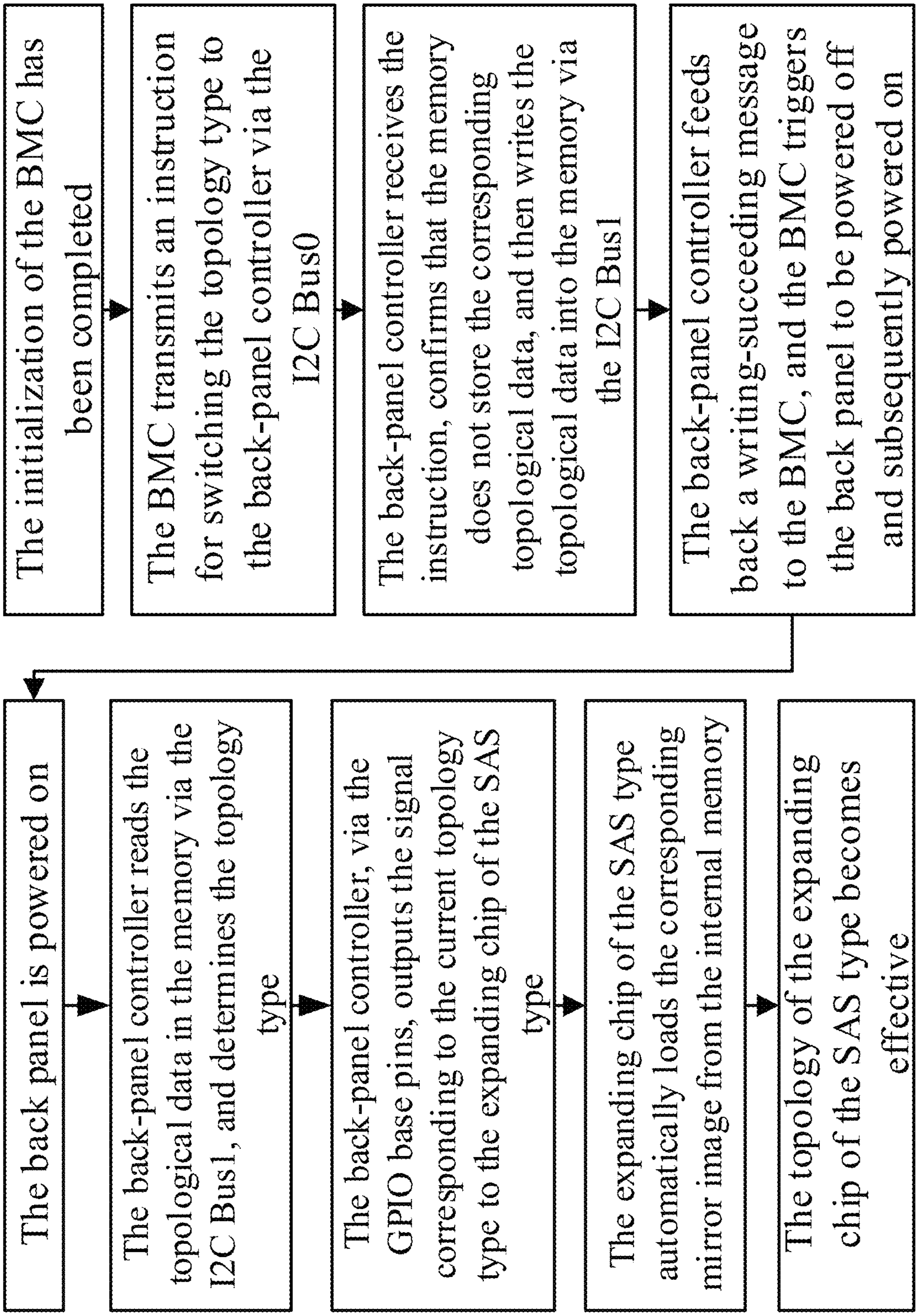
FIG. 5 is a flow chart of the modification of the topology type according to the present application.

Referring to FIG. 5, if the entire back panel is powered off or powered on during the topology modification, then, when it is required to modify the topology type of the SAS Expander, the BMC transmits an instruction for switching the topology type to the back-panel controller via the I2C Bus0. The back-panel controller, after receiving the instruction, if it confirms that the FRU does not have the corresponding topological data, writes the corresponding topological data into the FRU via the I2C Bus1. The back-panel controller transmits an instruction of writing completion to the BMC, and, after the BMC has received the instruction, controls the back panel to be powered off and powered on again. When the back panel of the server is electrified normally, the back-panel controller reads the topological data in the FRU via the I2C Bus1, to obtain the topology type applicable to the SAS Expander. The back-panel controller, via the outputting GPIO base pins of the back-panel controller itself, outputs the electrical-level signal corresponding to the current topology type to the SAS Expander, and the SAS Expander, according to the high-low-electrical-level mode of the GPIO base pins, loads the corresponding topology mirror image from the Flash. After the loading has completed, the topology of the SAS Expander becomes effective.

Certainly, the corresponding topology type may also be directly burned off line in the FRU, so as to realize that the different topologies of the SAS Expander become effective.

It can be seen that the present embodiment provides a solution for designing a back panel of a variable Expander topology. In the solution the FRU stores the topology type for the back-panel controller to read, and the back-panel controller controls the SAS Expander to load different mirror-image topologies, thereby realizing switching between the different topologies, which may conveniently configure the ports of the Expander, which reduces the cost on the hardware production and maintenance.

A port configuring apparatus according to the embodiments of the present application will be described below, and the port configuring apparatus described below and the port configuring method described above may refer to each other.

Figure 6:
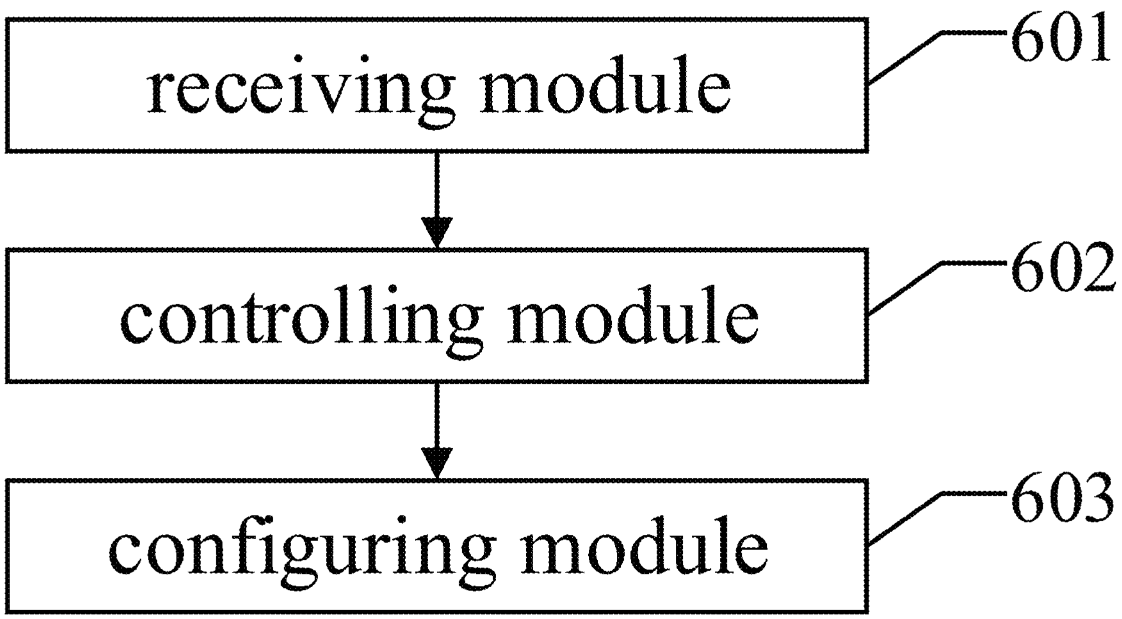
FIG. 6 is a schematic diagram of a port configuring apparatus according to the present application.

Referring to FIG. 6, an embodiment of the present application discloses a port configuring apparatus, wherein the port configuring apparatus is applied to a back-panel controller in a hard-disk expanding device, and the port configuring apparatus comprises:

a receiving module 601 configured for receiving a port configuring instruction sent by a base-board management controller;

a controlling module 602 configured for, in response to a memory of the hard-disk expanding device storing a port-configuration-topology type corresponding to the port configuring instruction, controlling a target expanding chip in the hard-disk expanding device to be powered off and subsequently powered on; and a configuring module 603 configured for, after the target expanding chip has been powered on, transmitting a target signal corresponding to the port-configuration-topology type to the target expanding chip, whereby the target expanding chip reads a port-configuration firmware mirror image corresponding to the target signal from an internal memory of the hard-disk expanding device, and based on the port-configuration firmware mirror image, configures ports of the target expanding chip itself.

In some embodiments of the present application, the receiving module is particularly configured for receiving the port configuring instruction via an Inter-Integrated Circuit (I2C) bus.

In some embodiments of the present application, the configuring module is particularly configured for:

reading and identifying the port-configuration-topology type from the memory;

inquiring the target signal corresponding to the port-configuration-topology type; and transmitting the target signal to the target expanding chip via a self-configurable lead.

In some embodiments of the present application, the apparatus further comprises:

a writing module configured for, in response to the memory not storing the port-configuration-topology type, acquiring the port-configuration-topology type from the base-board management controller, and writing the acquired port-configuration-topology type into the memory.

In some embodiments of the present application, the target expanding chip, after inquiring an internal-memory region corresponding to the target signal in the internal memory, and reading the port-configuration firmware mirror image within the internal-memory region, loads the port-configuration firmware mirror image, to complete the configuring of the ports of the target expanding chip itself.

In some embodiments of the present application, in response to initialization of the base-board management controller having been completed, the base-board management controller sends the port configuring instruction to the back-panel controller; or in response to the base-board management controller acquiring a port-configuration modifying instruction, the base-board management controller sends the port configuring instruction to the back-panel controller.

The more particular operation processes of the modules and units according to the present embodiment may refer to the corresponding contents disclosed in the above embodiments, and are not discussed further herein.

It can be seen that the present embodiment provides a port configuring apparatus, which may realize that, if the port configuring instruction sent by the base-board management controller specifies a certain type of the port configuration, the target expanding chip may employ the firmware mirror image corresponding to the corresponding topology type to configure the ports of the target expanding chip itself. Therefore, the same one target expanding chip may, under the controlling by the base-board management controller and the back-panel controller, realize the port configurations of different topology types, thereby increasing the utilization ratio of the target expanding chip, without newly adding a target expanding chip, and without re-performing hardware arrangement in the hard-disk expanding device. Therefore, the ports of the target expanding chip may be configured conveniently, which reduces the cost on the hardware production and maintenance.

A hard-disk expanding device according to the embodiments of the present application will be described below, and the hard-disk expanding device described below and the port configuring method and apparatus and the hard-disk expanding back panel described above may refer to each other.

Referring to FIG. 3 or 4, an embodiment of the present application discloses a hard-disk expanding device, wherein the hard-disk expanding device comprises a back-panel controller connected to a base-board management controller, a memory and a target expanding chip that are connected to the back-panel controller, and an internal memory connected to the target expanding chip.

The memory is configured for storing at least one port-configuration-topology type.

The internal memory is configured for storing a plurality of port-configuration firmware mirror images.

The back-panel controller is configured for:

receiving a port configuring instruction sent by the base-board management controller;

in response to the memory storing a current port-configuration-topology type corresponding to the port configuring instruction, controlling the target expanding chip to be powered off and subsequently powered on; and after the target expanding chip has been powered on, transmitting a target signal corresponding to the current port-configuration-topology type to the target expanding chip, whereby the target expanding chip reads an instance of the port-configuration firmware mirror images corresponding to the target signal from the internal memory, and based on the read port-configuration firmware mirror image, configures ports of the target expanding chip itself.

In some embodiments of the present application, the base-board management controller is connected to the back-panel controller via an Inter-Integrated Circuit (I2C) bus; and correspondingly, the back-panel controller is particularly configured for receiving the port configuring instruction via the I2C bus.

In some embodiments of the present application, the back-panel controller is connected to the target expanding chip via a self-configurable lead; and correspondingly, the back-panel controller is particularly configured for transmitting the target signal to the target expanding chip via a GPIO lead.

In some embodiments of the present application, the back-panel controller is further configured for:

in response to the memory not storing the current port-configuration-topology type corresponding to the port configuring instruction, acquiring the current port-configuration-topology type from the base-board management controller, and writing the acquired current port-configuration-topology type into the memory.

In some embodiments of the present application, the hard-disk expanding device further comprises:

a sensor connected to the back-panel controller; and correspondingly, the sensor is configured for detecting information of an environment where the hard-disk expanding device is located.

In some embodiments of the present application, the ports of the target expanding chip that are configured to be a downstream port are connected to a hard disk or an object expanding chip; and the ports of the target expanding chip that are configured to be an upstream port are connected to the back-panel controller.

In some embodiments of the present application, the back-panel controller transmits the target signal to the target expanding chip via the self-configurable lead.

In some embodiments of the present application, in response to the memory not storing the port-configuration-topology type, then the back-panel controller acquires the port-configuration-topology type from the base-board management controller, and writes the acquired port-configuration-topology type into the memory.

In some embodiments of the present application, the target expanding chip, after inquiring an internal-memory region corresponding to the target signal in the internal memory, and reading the port-configuration firmware mirror image within the internal-memory region, loads the port-configuration firmware mirror image, to complete the configuring of the ports of the target expanding chip itself.

In some embodiments of the present application, in response to initialization of the base-board management controller having been completed, the base-board management controller sends the port configuring instruction to the back-panel controller; or in response to the base-board management controller acquiring a port-configuration modifying instruction, the base-board management controller sends the port configuring instruction to the back-panel controller.

In some embodiments of the present application, the hard-disk expanding device or the hard-disk expanding back panel is provided in a server. In other words, a server comprising the hard-disk expanding device or the hard-disk expanding back panel may be provided.

It can be seen that the present embodiment provides a hard-disk expanding device, which may conveniently configure the ports of the expanding chip, which reduces the cost on the hardware production and maintenance.

An electronic device according to the embodiments of the present application will be described below, and the electronic device described below and the port configuring method and apparatus described above may refer to each other.

Figure 7:
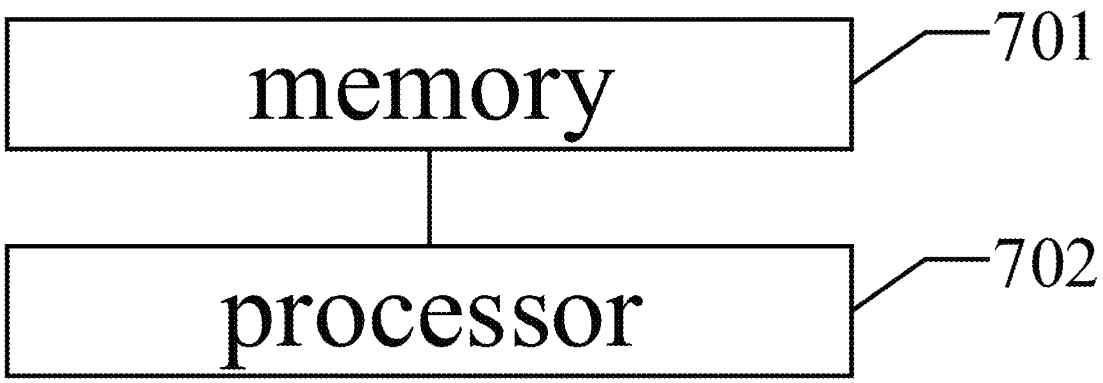
FIG. 7 is a schematic diagram of an electronic device according to the present application.

Referring to FIG. 7, an embodiment of the present application discloses an electronic device, wherein the electronic device comprises:

a memory 701 configured for storing a computer program; and a processor 702 configured for executing the computer program to implement the method according to any of the above embodiments.

Further, an embodiment of the present application further provides a server to serve as the electronic device stated above. The server may particularly comprise at least one processor, at least one memory, a power supply, a communication interface, an input-output interface and a communication bus. The memory is configured for storing a computer program, and the computer program is loaded and executed by the processor to implement the relevant steps of the port configuring method according to any one of the above embodiments.

In the present embodiment, the power supply is configured for supplying an operating voltage to the hardware devices of the server. The communication interface can create a datum transmission channel between the server and an external device, and the communication protocol that it follows is any communication protocol that can apply to the technical solutions of the present application, and is not particularly limited herein. The inputting-outputting interface is configured for acquiring data inputted from the external or outputting data to the external, and its particular interface type may be selected according to particular application demands, and is not particularly limited herein.

In addition, the memory, as the carrier for the resource storage, may be a read-only memory, a random access memory, a magnetic disk, an optical disk and so on, the resource stored thereon comprises an operating system, a computer program, data and so on, and the storage mode may be short-term storage or permanent storage.

The operating system is configured for managing and controlling the hardware devices and the computer programs in the server, to implement the operation and the processing of the data in the memory by the processor, and may be Windows Server, Netware, Unix, Linux and so on. The computer program, besides comprising the computer program that can be configured for completing the port configuring method according to any one of the above embodiments, may further comprise computer programs that can be configured for completing other particular operations. The data may not only include the data such as a virtual machine, but also may include the data such as the developer information of the virtual machine.

Further, an embodiment of the present application further provides a terminal to serve as the electronic device stated above. The terminal may particularly include but is not limited to a smartphone, a tablet personal computer, a notebook computer and a desktop computer.

Generally, the terminal according to the present embodiment comprises a processor and a memory.

The processor may comprise one or more processing cores, for example, a 4-core processor and an 8-core processor. The processor may be embodied in at least one of the hardware forms of DSP (Digital Signal Processing), FPGA (Field-Programmable Gate Array) and PLA (Programmable Logic Array). The processor may also comprise a host processor and a co-processor. The host processor refers to a processor that processes the data in the awakening state, and is also referred to as a CPU (Central Processing Unit). The co-processor refers to a low-power-consumption processor that processes the data in the standby state. In some embodiments, the processor may be integrated with a GPU (Graphics Processing Unit), wherein the GPU is configured for rendering and drawing the contents that the display screen is required to display. In some embodiments, the processor may further comprise an AI (Artificial Intelligence) processor, wherein the AI processor is configured for processing the calculating operations related to machine learning.

The memory may comprise one or more non-volatile readable storage mediums, wherein the non-volatile readable storage mediums may be non-transient. The memory may further comprise a high-speed random access memory and a non-volatile memory, for example, one or more magnetic-disk storage devices and flash-memory storage devices. In the present embodiment, the memory is at least configured for storing the following computer program, wherein the computer program, after loaded and executed by the processor, can implement the relevant steps of the port configuring method executed by the terminal side according to any one of the above embodiments. Additionally, the resources stored by the memory may further comprise an operating system, data and so on, wherein the storage mode may be short-term storage or permanent storage. The operating system may include Windows, Unix, Linux and so on. The data may include but are not limited to the information of the updating of application programs.

In some embodiments, the terminal may further comprise a display screen, an input-output interface, a communication interface, a sensor, a power supply and a communication bus.

A non-volatile readable storage medium according to the embodiments of the present application will be described below, and the non-volatile readable storage medium described below and the port configuring method and apparatus and the device described above may refer to each other.

A non-volatile readable storage medium, wherein the non-volatile readable storage medium is configured for saving a computer program, and the computer program, when executed by a processor, implements the method according to the above embodiments.

The “first”, “second”, “third”, “fourth” and so on (if necessary) involved in the present application are intended to distinguish similar objects, and are not necessarily used to describe a particular order or sequence. It should be understood that the data so used may be interchanged in suitable cases, whereby the embodiments described herein can be implemented in other sequences than the contents illustrated or described herein. Moreover, the terms “comprise” and “have” and any variation thereof are intended to cover non-exclusive inclusions. For example, a process, method or device that comprises a series of steps or units is not necessarily limited to those steps or units clearly listed, but may comprise other steps or units that are not clearly listed or that are inherent to the process, method or device.

It should be noted that the descriptions involving “first”, “second” and so on in the present application are merely for the purpose of describing, and should not be construed as indicating or implying the degrees of importance or implicitly indicating the quantity of the specified technical features. Accordingly, the features defined by “first” and “second” may explicitly or implicitly comprise at least one of the features. In addition, the technical solutions of the embodiments may be combined with each other, but the combinations must be on the basis that they can be implemented by a person skilled in the art. Where a combination of the technical solutions is contradictory or unimplementable, it should be deemed that such a combination of the technical solutions does not exist, and does not fall within the protection scope of the present application.

The embodiments of the description are described in the mode of progression, each of the embodiments emphatically describes the differences from the other embodiments, and the same or similar parts of the embodiments may refer to each other.

The steps of the method or algorithm described with reference to the embodiments disclosed herein may be implemented directly by using hardware, a software module executed by a processor or a combination thereof. The software module may be embedded in a Random Access Memory (RAM), an internal memory, a read-only memory (ROM), an electrically programmable ROM, an electrically erasable programmable ROM, a register, a hard disk, a removable disk, a CD-ROM, or a readable storage medium in any other form well known in the art.

The principle and the embodiments of the present application are described herein with reference to the particular examples, and the description of the above embodiments is merely intended to facilitate to comprehend the method according to the present application and its core concept. Moreover, for a person skilled in the art, according to the concept of the present application, the particular embodiments and the range of application may be varied. In conclusion, the contents of the description should not be understood as limiting the present application.

The invention claimed is:

1. A port configuring method, wherein the port configuring method is applied to a back-panel controller in a hard-disk expanding device, and the port configuring method comprises:

receiving a port configuring instruction sent by a base-board management controller;

in response to a memory of the hard-disk expanding device storing a port-configuration-topology type corresponding to the port configuring instruction, controlling a target expanding chip in the hard-disk expanding device to be powered off and subsequently powered on; and after the target expanding chip has been powered on, transmitting a target signal corresponding to the port-configuration-topology type to the target expanding chip, whereby the target expanding chip reads a port-configuration firmware mirror image corresponding to the target signal from an internal memory of the hard-disk expanding device, and based on the port-configuration firmware mirror image, configures ports of the target expanding chip itself.

2. The port configuring method according to claim 1, wherein the port-configuration-topology type is for indicating a port of the target expanding chip that is connected to a server and a port of the target expanding chip that is connected to a hard disk.

3. The port configuring method according to claim 1, wherein an upstream port of the target expanding chip is for connecting to a chip of the base-board management controller that has a type the same as a type of the target expanding chip, and a downstream port of the target expanding chip is cascaded to another expanding chip or is directly connected to a hard disk.

4. The port configuring method according to claim 1, wherein the step of receiving the port configuring instruction sent by the base-board management controller comprises:

receiving the port configuring instruction via an Inter-Integrated Circuit (I2C) bus.

5. The port configuring method according to claim 1, wherein the step of transmitting the target signal corresponding to the port-configuration-topology type to the target expanding chip comprises:

reading and identifying the port-configuration-topology type from the memory;

inquiring the target signal corresponding to the port-configuration-topology type; and transmitting the target signal to the target expanding chip via a self-configurable lead.

6. The port configuring method according to claim 1, wherein the port configuring method further comprises:

in response to the memory not storing the port-configuration-topology type, acquiring the port-configuration-topology type from the base-board management controller, and writing the acquired port-configuration-topology type into the memory.

7. The port configuring method according to claim 1, wherein the target expanding chip, after inquiring an internal-memory region corresponding to the target signal in the internal memory, and reading the port-configuration firmware mirror image within the internal-memory region, loads the port-configuration firmware mirror image, to complete the configuring of the ports of the target expanding chip itself.

8. The port configuring method according to claim 1, wherein in response to initialization of the base-board management controller having been completed, the base-board management controller sends the port configuring instruction to the back-panel controller; or in response to the base-board management controller acquiring a port-configuration modifying instruction, the base-board management controller sends the port configuring instruction to the back-panel controller.

9. The port configuring method according to claim 1, wherein the back-panel controller is configured for controlling powering-off or powering-on of the target expanding chip solely, and the base-board management controller is configured for controlling powering-off or powering-on of a back panel where the back-panel controller is located.

10. The port configuring method according to claim 1, wherein the port configuring method further comprises:

receiving a topology-type switching instruction sent by the base-board management controller;

in response to the memory of the hard-disk expanding device not storing topological data corresponding to the topology-type switching instruction, writing the topological data corresponding to the topology-type switching instruction into the memory, and after the writing has been completed, sending a writing-completion instruction to the base-board management controller, wherein the base-board management controller, after receiving the writing-completion instruction, controls a back panel corresponding to the back-panel controller to be powered off and subsequently powered on; and when the back panel is electrified normally, reading the topological data stored in the memory, and outputting an electrical-level signal corresponding to the topological data via a self-configurable lead to the target expanding chip, whereby the target expanding chip, according to a high-low-electrical-level mode of the electrical-level signal, loads a corresponding topology mirror image from the internal memory of the hard-disk expanding device, to complete switching of a topology type.

11. A hard-disk expanding device, wherein the hard-disk expanding device comprises a back-panel controller connected to a base-board management controller, a memory and a target expanding chip that are connected to the back-panel controller, and an internal memory connected to the target expanding chip;

the memory is configured for storing at least one port-configuration-topology type;

the internal memory is configured for storing a plurality of port-configuration firmware mirror images; and the back-panel controller is configured for:

receiving a port configuring instruction sent by the base-board management controller;

in response to the memory storing a current port-configuration-topology type corresponding to the port configuring instruction, controlling the target expanding chip to be powered off and subsequently powered on; and after the target expanding chip has been powered on, transmitting a target signal corresponding to the current port-configuration-topology type to the target expanding chip, whereby the target expanding chip reads an instance of the port-configuration firmware mirror images corresponding to the target signal from the internal memory, and based on the read port-configuration firmware mirror image, configures ports of the target expanding chip itself.

12. The hard-disk expanding device according to claim 11, wherein the base-board management controller is connected to the back-panel controller via an Inter-Integrated Circuit (I2C) bus; and correspondingly, the back-panel controller is configured for receiving the port configuring instruction via the I2C bus.

13. The hard-disk expanding device according to claim 11, wherein the back-panel controller is connected to the target expanding chip via a self-configurable lead; and correspondingly, the back-panel controller is configured for transmitting the target signal to the target expanding chip via the self-configurable lead.

14. The hard-disk expanding device according to claim 11, wherein the back-panel controller is further configured for:

in response to the memory not storing the current port-configuration-topology type corresponding to the port configuring instruction, acquiring the current port-configuration-topology type from the base-board management controller, and writing the acquired current port-configuration-topology type into the memory.

15. The hard-disk expanding device according to claim 11, wherein the hard-disk expanding device further comprises:

a sensor connected to the back-panel controller; and correspondingly, the sensor is configured for detecting information of an environment where the hard-disk expanding device is located.

16. The hard-disk expanding device according to claim 15, wherein the sensor is a temperature sensor for detecting a temperature of the environment where the hard-disk expanding device is located; or the sensor is a humidity sensor for detecting a humidity of the environment where the hard-disk expanding device is located.

17. The hard-disk expanding device according to claim 11, wherein ports of the target expanding chip that are configured to be a downstream port are connected to a hard disk or an object expanding chip; and ports of the target expanding chip that are configured to be an upstream port are connected to the back-panel controller.

18. An electronic device, wherein the electronic device comprises:

a memory configured for storing a computer program; and a processor configured for executing the computer program to implement the port configuring method according to claim 1.

19. A non-transitory readable storage medium, wherein the non-transitory readable storage medium is configured for saving a computer program, and the computer program, when executed by a processor, implements the port configuring method according to claim 1.

20. The port configuring method according to claim 7, wherein different instances of the internal-memory region in the internal memory store mirror images of different port-configuration firmware.

* * * * *